United States Patent [19]
Kotera et al.

[11] Patent Number: 4,734,480
[45] Date of Patent: Mar. 29, 1988

[54] RADIATION CURABLE RESIN

[75] Inventors: Nobukazu Kotera; Yasuo Yoshinaka; Shinpei Yamamoto; Hideyuki Ohashi, all of Ohtsu; Yoshinobu Ninomiya; Kiyokazu Oiyama, both of Miyagi, all of Japan

[73] Assignees: Toyo Boseki Kabushiki Kaisha, Osaka; Sony Corporation, Tokyo, both of Japan

[21] Appl. No.: 60,471

[22] Filed: Jun. 11, 1987

[30] Foreign Application Priority Data

Jun. 12, 1986 [JP] Japan .................. 61-136428

[51] Int. Cl.$^4$ ............................. C08G 18/38
[52] U.S. Cl. ........................ 528/49; 528/71
[58] Field of Search ..................... 528/49, 71

[56] References Cited

U.S. PATENT DOCUMENTS 4,367,302  1/1983  Le Roy et al. ............... 524/104
4,683,280  7/1987  Ukachi et al. ............... 528/71

FOREIGN PATENT DOCUMENTS 0085722  8/1983  Japan .

Primary Examiner—Maurice J. Welsh
Attorney, Agent, or Firm—Wegner & Bretschneider

[57] ABSTRACT

A radiation curable resin which is a polyurethane acrylate having (meth)acryloyloxy groups at the terminal end of the molecule and in the molecular chain thereof, and containing metal sulfonate groups in the molecule in a ratio of 3.0 to 1,500 equivalent/$10^6$ g of the resin, said polyurethane acrylate being obtained by reaction of (1) a copolyester having hydroxyl groups at both terminal ends of the molecule and containing metal sulfonate groups therein,
(2) a diisocyanate,
(3) a compound (A) having at least one (meth)acryloyloxy group and two hydroxyl groups,
(4) a compound (B) having at least one (meth)acryloyloxy group and one hydroxyl group, and optionally
(5) a polyol other than the above (1) or (3). the radiation curable resin containing a compound (C) having at least one carboxylic acid group and two hydroxyl groups in addition to the above components (1) to (5) is also disclosed.

17 Claims, No Drawings

RADIATION CURABLE RESIN

FIELD OF THE INVENTION

The present invention relates to a radiation curable resin, particularly, an electron radiation curable resin having improved curing characteristics and mechanical properties.

BACKGROUND OF THE INVENTION

There have been synthesized various electron radiation curable resins wherein double bonds in the molecules thereof are cleaved by irradiation of electron rays to proceed crosslinking reaction and to effect curing of the resins. Electron radiation curable resins include acrylic double bond-introduced resins such as vinyl chloride-vinyl acetate copolymers, epoxy resins, polyester resins, polyurethane resins, acrylic resins and the like. Such a resin is used as, for example, a binder for a magnetic composition used in the production of a magnetic recording medium such as a magnetic tape. In this case, an electron radiation curable resin is admixed with magnetic particles together with a solvent to give a magnetic composition. The magnetic composition is coated on a non-magnetic base to give a magnetic recording medium. By irradiation of electron rays on the coated surface, crosslinking reaction proceeds to effect curing of the resin. Thereby, mechanical properties and solvent resistance of the coated surface are improved. It has been known that, according to this manner, a heat treatment step can be simplified and a product in constant quality can be obtained.

Japanese Patent Kokai No. 59-77624 discloses a magnetic recording medium wherein an electron radiation curable resin is used as the binder in the magnetic composition thereof. The electron radiation curable resin is composed of a polyester urethane acrylate having plural double bonds at the terminal ends of the molecular chain, and metal sulfonate groups which has good affinity for magnetic particles in the side chains. However, since the resin has double bonds only at the terminal ends of the molecular chain, only terminal ends of the molecular chains can be crosslinked each other by irradiation of electron rays. Accordingly, crosslink density tends to become lower as increase in the molecular weight of the resin, which results in insufficient improvement of mechanical properties and solvent resistance of the coated surface.

In order to improve such a drawback, Japanese Patent Kokai No. 60-63221 discloses an electron radiation curable resin which also has double bonds in the side chains thereof. This electron radiation curable resin is obtained by reacting a prepolymer having isocyanate groups at both terminal ends and the side chains thereof, which is obtained by reaction of a copolyester with a polyisocyanate, with a compound having active hydrogen and a double bond in the molecule thereof. However, in this case, there occurs not only introduction of double bonds into the side chains, but also formation of three-dimentional structure due to branching of polyurethane acrylate through urethane bond. Accordingly, the polyurethane acrylate obtained contains gel, which results in such a problem that the objective resin in constant quality can hardly be obtained.

Further, hitherto, there has been such a problem that, when a binder for a magnetic composition which can provide good dispersion of magnetic particles in the composition is used, in general, it is difficult to stabilize their dispersion in the composition.

OBJECTS OF THE INVENTION

The present invention solves the above problems. That is, one object of the present invention is to provide a radiation curable resin, particularly, an electron curable resin which has improved mechanical properties and solvent resistance as well as improved affinity for magnetic particles.

Another object of the present invention is to provide a radiation curable resin having improved mechanical properties and solvent resistance as well as improved affinity for magnetic particles which does not form gel during synthesis thereof.

Still another object of the present invention is to provide a radiation curable resin which can disperse magnetic particles in a magnetic composition very well and can provide good dispersion stability of magnetic particles, when it is used as a binder for a magnetic composition in the production of a magnetic recording medium.

These objects as well as other objects and advantages of the present invention will become apparent to those skilled in the art from the following description.

SUMMARY OF THE INVENTION

It has been found that a resin obtained by reacting a copolyester having hydroxyl groups at both terminal ends of the molecule and containing metal sulfonate groups with diisocyanate to obtain a prepolymer having terminal isocyanate groups, and then reacting the prepolymer with a compound having (meth)acryloyloxy and hydroxyl group is useful as a radiation curable resin having improved mechanical properties and solvent resistance as well as good affinity for magnetic particles because it has acrylic double bonds at both terminal ends and the side chains of the molecule. Further, it has been also found that this resin can be constantly produced without formation of gel during the reaction steps.

Thus, as the first aspect of the present invention, there is provided a radiation curable resin which is a polyurethane acrylate having (meth)acryloyloxy groups at the terminal ends of the molecule and in the molecular chain thereof, and containing metal sulfonate groups in the molecule in a ratio of 3.0 to 1,500 equivalent/$10^6$ g of the resin, said polyurethane acrylate being obtained by reaction of (1) a copolyester having hydroxyl groups at both terminal ends of the molecule and containing a metal sulfonate group therein,
(2) a diisocyanate,
(3) a compound (A) having at least one (meth)acryloyloxy group and two hydroxyl groups,
(4) a compound (B) having at least one (meth)acryloyloxy group and one hydroxyl group, and optionally (5) a polyol other than the above (1) or (3).

As the second aspect of the present invention, there is also provided a radiation curable resin which is a polyurethane acrylate having (meth)acryloyloxy groups at the terminal ends of the molecule and in the molecular chain thereof, containing metal sulfonate groups in the molecule in a ratio of 3.0 to 1,500 equivalent/$10^6$ g of the resin, and further containing carboxyl groups in the molecule in a ratio of 5.0 to 2,000 equivalent/$10^6$ g of the resin, said polyurethane acrylate being obtained by reaction of
  (1) a copolyester having hydroxyl groups at both terminal ends of the molecule and containing a metal sulfonate group therein,
  (2) a diisocyanate,
  (3) a compound (A) having at least one (meth)acryloyloxy group and two hydroxyl groups,
  (4) a compound (B) having at least one (meth)acryloyloxy group and one hydroxyl groups.
  (5) a compound (C) having at least one carboxyl group and two hydroxyl groups, and optionally
  (6) a polyol other than the above (1), (3) or (5).

The term "(meth)acryloyloxy" used herein means both acryloyloxy and methacryloyloxy. Likewise, the term "(meth)acrylate" used herein means both acrylate and methacrylate.

Since the radiation curable resin of the present invention has metal sulfonate groups and further carboxyl groups in the molecule as well as acrylic double bonds at both terminal ends and in the side chains, the resin has improved affinity for magnetic particles and, when irradiation is effected, its mechanical properties are remarkably improved. Therefore, when a magnetic composition for a magnetic recording medium is prepared by using this resin, dispersibility of magnetic particles as well as dispersion stability of magnetic particles are improved and magnetic particles are uniformly dispersed in a magnetic layer formed by the composition to provide improved mechanical properties and magnetic properties. Further, the resin can be synthesized without formation of gel, which facilitates formation of a magnetic layer having uniform mechanical properties and magnetic properties. Thus, the resin of the present invention is useful as a binder for a magnetic composition in the production of a magnetic recording medium such as a magnetic tape.

DETAILED DESCRIPTION OF THE INVENTION

The copolyester used in the present invention is mainly composed of a dicarboxylic acid component and a glycol component.

Examples of the dicarboxylic acid component include aromatic dicarboxylic acids such as terephthalic acid, isophthalic acid, orthophthalic acid, 1,5-naphthalic acid, etc.; aromatic hydroxy carboxylic acids such as p-hydroxybenzoic acid, p-(hydroxyethoxy)benzoic acid, etc.: aliphatic dicarboxylic acids such as succinic acid, adipic acid, azelaic acid, sebacic acid, dodecane dicarboxylic acid, etc.; and unsaturated aliphatic and alicyclic dicarboxylic acids such as fumaric acid, maleic acid, itaconic acid, hexahydrophthalic acid, tetrahydrophthalic acid, etc. If necessary, the dicarboxylic acid component may contain a small amount of tri and tetracarboxylic acids such as trimellitic acid, trimesic acid, pyromellitic acid, etc.

Examples of the glycol component include diols such as ethylene glycol, propylene glycol, 1,3-propanediol, 1,4-butanediol, 1,5-pentanediol, 1,6-hexanediol, neopentyl glycol, diethylene glycol, dipropylene glycol, 2,2,4-trimethyl-1,3-pentanediol, 1,4-cyclohexanedimethanol, spiroglycol, 1,4-phenylene glycol, ethylene oxide adduct of 1,4-phenylene glycol, ethylene oxide or propylene oxide adduct of bisphenol A, ethylene oxide of propylene oxide adduct of hydrogenated bisphenol A, polyethylene glycol, polypropylene glycol, polytetramethylene glycol, etc. If necessary, the glycol component may contain a small amount of triols and tetraols such as trimethylolethane, trimethylolpropane, glycerin, pentaerythritol, etc.

In the present invention, the copolyester contains metal sulfonate groups such as alkaline metal sulfonate groups, alkaline earth metal sulfonate groups, etc. and, thereby, the resulting radiation curable resin has improved affinity for magnetic particles to enhance dispersibility of magnetic particles. In order to incorporate metal sulfonate groups into the copolyester, a compound containing a metal sulfonate group is used as a part of the above dicarboxylic acid or glycol ingredient.

As the dicarboxylic acid ingredient containing a metal sulfonate group, there can be used, for example, aromatic dicarboxylic acids containing metal sulfonate groups such as 2-sodium sulfoterephthalic acid, 2-potassium sulfoterephthalic acid, 5-sodium sulfoisophthalic acid, 5-potassium sufloisophthalic acid, etc.

As the glycol ingredient containing a metal sulfonate group, there can be used, for example, ethylene oxide adduct of 2-sodium sulfobisphenol A, 2-sodium sulfo-1,4-phenylene glocol, ethylene oxide adduct of 2-sodium sulfo-1,4-phenylene glycol, etc.

The metal sulfonate groups should be present in the copolyester in such an amount that the resulting radiation curable resin contains the groups in a ratio of 3.0 to 1,500 equivalent/$10^6$ g, preferably, 5.0 to 500 equivalent/$10^6$ g. When the ratio of the metal sulfonate groups is less than 3.0 equivalent/$10^6$ g of the resin, the resulting radiation curable resin has low affinity for magnetic particles and, therefore, when it is used as a binder of a magnetic composition in a magnetic recording medium, dispersibility of magnetic particles is inferior, which results in deterioration of surface smoothness and durability of the resulting magnetic recording medium. When the ratio is more than 1,500 equivalent/$10^6$ g, solubility of the resin in a solvent is lowered.

In order to introduce hydroxyl groups into both terminal ends of the copolyester, the glycol ingredient is used in an excess amount in comparison with the carboxylic acid ingredient. Preferably, the synthesis of the copolyester is carried out so that the carboxyl terminal groups are present in a ratio of less than 50 equivalent/$10^6$ g of the copolyester, preferably, less than 20 equivalent/$10^6$ g of the copolyester. When the ratio of the carboxyl terminal groups is more than 50 equivalent/$10^6$ g of the copolyester, too many inactive terminal groups are present in the reaction with the diisocyanate described hereinafter, and a desired radiation curable resin having improved mechanical properties and solvent resistance can hardly be obtained. The synthesis of the copolyester can be carried out according to a known method. The molecular weight of the copolyester is usually in the range of 600 to 10,000, preferably, 1,000 to 6,000. When the molecular weight is less than 600, the resulting radiation curable resin is deficient in flexibility. On the other hand, when the molecular weight is more than 10,000, the distance between crosslinked points formed by irradiation of the resulting radiation curable resin becomes larger, which results in insufficient crosslink density and inferior meohanical properties and solvent resistance.

Examples of the diisocyanate used in the present invention include 2,4-tolylene diisocyanate, 2,6-tolylene diisocyanate, p-phenylene diisocyanate, diphenylmethane diisocyanate, m-phenylene diisocyanate, hexamethylene diisocyanate, tetramethylene diisocyanate, 3,3'-dimethoxy-4,4'-biphenylene diisocyanate, 2,4-naphthalene diisocyanate, 3,3'-dimethyl-4,4'-biphenylene diisocyanate, 4,4'-diphenylene diisocyanate, 4,4'-diisocyanato diphenyl ether, 1,5-naphthalene diisocyanate, p-xylylene diisocyanate, m-xylylene diisocyanate, 1,3-diisocyanato methylcyclohexane, 1,4-diisocyanato methylcyclohexane, 4,4'-diisocyanato dicyclohexane, 4,4'-diisocyanato dicyclohexylmethane, isophorone diisocyanate and the like. The diisocyanate is reacted with the copolyester in a ratio of 1 to 100 parts by weight, preferably, 2 to 70 parts by weight per 100 parts by weight of the copolyester. When the ratio is less than 1 part, a desired radiation curable polymer is scarcely obtained because the ratio of isocyanate group to hydroxyl group becomes too small and undesired polymers such as that containing isocyanate group only at one terminal end of the polymer, that containing no isocyanate group at both terminal ends of the polymer and that having a larger molecular weight due to chain extension by attachment of the copolyester through urethane bond are formed. On the other hand, when the ratio is more than 100 parts, an unreacted diisocyanate remains in a reaction system and preferentially reacts with the compound having (meth)acryloyloxy group and hydroxyl group used in the next step, which results in prevention of introduction of acrylic double bonds into the prepolymer having isocyanate terminals. The ratio of hydroxyl group of the copolyester to isocyanate group of the diisocyanate is preferably OH/NCO=50 to 125/200 (ratio of equivalents).

In the first aspect of the present invention, the copolyester, the diisocyanate, the compound (A), the compound (B) and optionally a polyol other than the copolyester and the compound (A) are reacted. In the second aspect of the present invention, the copolyester, the diisocyanate, the compound (A), the compound (B), the compound (C) and optionally a polyol other than the copolyester or the compound (A) or (C) are reacted. Thereby, the desired radiation curable resin having acrylic double bonds at both terminal ends and the side chains of the molecular chain can be obtained.

The compound (A) has at least one (meth)acryloyloxy group and two hydroxyl groups, and is used for introduction of acrylic double bonds into the side chains. The two hydroxyl groups of the compound (A) undergo polyaddition reaction with isocyanates of the prepolymer having terminal isocyanates and/or the diisocyanate. On the other hand, the compound (B) has at least one (meth)acryloyloxy group and one hydroxyl group, and is used for introduction of acrylic double bonds at both terminal ends of the molecular chain. Preferably, the hydroxyl group of the compound (B) undergoes addition to isocyanate group of the prepolymer having terminal isocyanate. The polyol other than the copolymer or the compound (A) is used for controlling a concentration of acrylic double bonds to be introduced in the side chains, a molecular weight of the resin and a concentration of urethane bonds. The concentration of acrylic double bonds is corresponding to crosslink density of the resulting radiation curable resin irradiated with electron rays and the like.

Examples of the compound (A) include mono(meth)acrylates of triols such as trimethylolpropane, trimethylolethane, glycerin, etc.; di(meth)acrylates of tetraols such as pentaerythritol, etc.: and 2 mole (meth)acrylic acid adducts of diepoxy compounds. The compound (A) is reacted with the copolyester which is the main chain of the prepolymer having terminal isocyanates in a ratio of 0.1 to 50 parts by weight, preferably, 0.5 to 30 parts by weight per 100 parts by weight of the copolyester. When the ratio is less than 0.1 part by weight, the concentration of acrylic double bonds introduced into the side chains becomes low, and crosslink density of the resulting radiation curable resin irradiated with electron rays and the like is lowered. When the ratio is more than 50 parts by weight, crosslink density becomes too high and mechanical strength is remarkably impaired.

Examples of the compound (B) include mono(meth)acrylates of diols such as ethylene glycol, propylene glycol, etc.; di(meth)acrylates of triols such as trimethylolpropane, glycerin, etc.; tri(meth)acrylates of tetraols such as pentaerythritol, etc.; penta(meth)acrylate of dipentaerythritol, etc. The compound (B) is reacted with the copolyester which is the main chain of the prepolymer having terminal isocyanates in a ratio of 0.1 to 50 parts by weight, preferably , 0.5 to 40 parts by weight per 100 parts by weight of the copolyester. When the ratio is less than 0.1 part by weight, an undesirable polymer such as that having acrylic double bond only at one terminal end or having no acrylic double bond at terminal ends and crosslink density of the resulting radiation curable resin irradiated with electron rays and the like is lowered. There is no need to use the compound (B) in a ratio of more than 50 parts by weight and further, when the compound (B) is used in such a higher ratio, a molecular weight of the resulting resin may be lowered depending on a production method.

The compound (C) has at least one carboxyl group and two hydroxyl groups and is used for introducing carboxyl groups into the radiation curable resin. Like the compound (A), two hydroxyl groups in the compound (C) undergo polyaddition reaction with isocyanates of the prepolymer having terminal isocyanates and/or the diisocyanate. Like the metal sulfonate groups contained in the copolyester, the introduced carboxyl groups improve affinity of the resulting radiation curable resin for magnetic particles. That is, when the radiation curable resin of the present invention is used as a binder of a magnetic composition for a magnetic recording medium, excellent dispersibility of magnetic particles can be obtained by the metal sulfonate groups together with carboxyl groups in the resin and dispersion stability of magnetic particles is improved by carboxyl groups in the resin. Further, carboxyl groups in the resin have such additional advantages that there is no hindrance to crosslinking due to carboxyl groups upon irradiation, and solubility of the resin in a solvent is scarcely decreased even under high carboxyl group concentration. Thus, in the present invention, the metal sulfonate groups and carboxyl groups are introduced in the resin by including the metal sulfonate groups in the copolyester and including carboxyl groups in the chain extender, i.e., the compound (C). This is resulted from the fact that a solvent used is considerably limited because a compound containing a metal sulfonate group generally has a very high polarity and is soluble in a limited solvent having a high polarity or a high boiling point, and it is difficult to include carboxyl group in the copolyester for the purpose of the present invention.

Examples of the compound (C) include dihydroxymonocarboxylic acids such as 2,3-dihydroxy-propionic acid, 2,3-dihydroxy-2-methylpropionic acid, 2,2-dihydroxymethylpropionic acid (dimethylolpropionic acid), 2,3-dihyroxy-2-(1-methyletnyl)butanoic acid, 3,11-dihyroxy-teteradecanoic acid, 9,10-dihyroxyoctadecanoic acid, etc.; dihydroxydicarboxylic acids such as 2,3-dihydroxybutanoic diacid, 2,3-dihydroxy- 2-methylbutanoic diacid, 2,4-dihyroxypentanoic diacid, 2,4-dihydroxy-3-methylpentanoic diacid, 2,5-dihydroxyhexanoic diacid, 9,10-dihyroxyoctadecanoic diacid, 2,3-dihyroxy-2-butenoic diacid, etc.; and dihydroxytricarboxylic acids such as 1,2-dihyroxy-1,2,2-tricarboxylic acid, 1,3-dihydroxypropane-1,1,3-tricarboxylic acid, etc. The compound (C) is subjected to the reaction in such an amount that 5.0 to 2,000 equivalent/$10^6$ g, preferably, 10.0 to 1,000 equivalent/$10^6$ g of carboxyl groups are present in the resulting radiation curable resin. When carboxyl groups are present in an amount less than 5.0 equivalent/$10^6$ g, it is difficult to obtain excellent dispersibility and dispersion stability of magnetic particles in the case of using the resin as a binder of a magnetic composition in the production of a magnetic recording medium. On the other hand, when carboxyl groups are present in an amount more than 2,000 equivalent/$10^6$ g, a magnetic layer obtained has inferior water resistance and humidity resistance.

The polyol other than the copolyester, the compound (A) or the compound (C) is used for controlling the concentration of acrylic double bonds and carboxyl groups introduced into the side chains, the molecular weight of the resin and the concentration of urethane bond. The concentration of acrylic double bond is corresponding to crosslink density of the resulting radiation curable resin irradiated with electron rays and the like. Examples of the polyol other then the copolyester, the compound (A) or the compound (C) include ethylene glycol, propylene glycol, 1,3-propanediol, 1,4-butanediol, 1,5-pentanediol, 1,6-hexanediol, neopentyl glycol, diethylene glycol, dipropylene glycol, 2,2,4-trimethyl-1,3-pentanediol, 1,4-cyclohexane methanol, spyroglycol, ethylene oxide adduct and propylene oxide adduct of bisphenol A, polyethylene glycol, polypropylene glycol, polytetramethylene glycol, trimethylolethane, glycerin, pentaerythritol, etc. The polyol is subjected to the reaction in an amount of not more than 50 parts by weight per 100 parts by weight of the copolyester. When the amount is more than 50 parts by weight, the concentration of acrylic double bonds introduced into the side chains is lowered and therefore crosslink density of the resulting radiation curable resin irradiated with electron rays and the like. The molecular weight of the polyol is preferably not more than 1,000. Likewise, when the molecular weight is more than 1,000, crosslink density of the resulting radiation curable resin irradiated with electron rays and the like is lowered.

The radiation curable polyurethane acrylate resin of the present invention is produced by reaction of the copolyester having hydroxyl groups at both terminal ends and containing the metal sulfonate groups, the diisocyanate, the compound (A) having at least one (meth)acryloyloxy group and two hydroxyl groups, the compound (B) having at least one (meth)acryloyloxy group and one hydroxyl group and, if any, the compound (C) having at least one carboxyl group and two hydroxyl groups, and optionally the polyol other than the copolyester, the compound (A) or the compound (C) (hereinafter merely referred to as "other polyol"). The order of the reaction is not limited. That is, for example, the resin of the present invention is produced by a process (i) which comprises reacting the copolyester with the diisocyanate in a ratio of OH/NCO=50/200 to 125/200 (equivalent ratio) to obtain the prepolymer having terminal isocyanates, reacting the prepolymer with the compound (A) and, if any, the compound (C), and optionally the other polyol in a ratio of hydroxyl group to isocyanate group in the prepolymer having terminal isocyanates of 1 to 99/100, preferably, 55 to 99/100 (equivalent ratio), and then reacting the resultant with the compound (B) in such an amount that hydroxyl group equivalent is the same as the remaining isocyanate group equivalent. The resin is also produced by a process (ii) which comprises reacting the compound (B) with the prepolymer having terminal isocyanates in a ratio of hydroxyl group to isocyanate group in the prepolymer of 1 to 99/100, preferably, 1 to 50/100 (equivalent ratio), and then reacting the resultant with the compound (A) and, if any, the compound (C), and optionally the other polyol in such an amount that hydroxyl group equivalent is the same as the remaining isocyanate group equivalent. The resin is also produced by a process (iii) which comprises reacting the prepolymer having terminal isocyanates with the compound (A), the compound (B) and, if any, the compound (C) and optionally the other polyol in such a ratio that hydroxyl group equivalent is the same as isocyanate group equivalent in the prepolymer. Further, the resin is also produced by a process (iv) which comprises reacting the copolyester, the diisocyanate, the compound (A) and, if any, the compound (C) in a ratio of OH/NCO=50/200 to 150/200 (ratio of equivalents) to obtain the prepolymer having terminal isocyanates and then reacting the resultant with the compound (B) and optionally the other polyol in such a ratio that hydroxyl group equivalent is the same equivalent an isocyanate group equivalent in the prepolymer. Further, the resin can be also produced by a process (v) wherein the reaction order of the compounds (A) and (B) in the process (iv) is exchanged, or by a process (vi) wherein the reaction order of the compounds (C) and (B) in the process (iv) is exchanged. In the processes (i) to (vi) additional diisocyanate can be added after formation of the prepolymer having terminal isocyanates. However, it is necessary to also add the compounds (A), (B) and, if any, (C) and the other polyol in such an amount that hydroxyl group equivalent is the same as the isocyanate equivalent derived from the additional diisocyanate. Furthermore, the resin can be produced by a process (vii) which comprising reacting the copolyester with the diisocyanate in a ratio of OH/NCO=75/200 to 125/200 (equivalent ratio) to obtain the prepolymer having terminal isocyanates, reacting the resultant with the compound (B) in a ratio of OH/NCO=45 to 75/75 to 125 (equivalent ratio), admixing with the additional diisocyanate and then reacting the resultant with the compounds (A) and, if any (C) in such an amount that hydroxyl group equivalent is the same as isocyanate equivalent. Furthermore, the resin can be produced by a process (viii) wherein the reaction order of the compounds (A) and (B) in the proceed (vii) is exchanged, or a process (ix) the reaction order of the compounds (B) and (C) in the process (vii) is exchanged. In addition, the other polyol can be reacted with the copolyester in the above processes (i) to (viii). Particularly, in the present invention, the above processes (i), (ii), (vii) and (viii) are preferred.

The radiation curable resin of the present invention thus obtained has acrylic double bonds at both terminal ends and in the side chains of the molecule. When the resin is irradiated with electron rays and the like, acrylic double bonds undergo crosslinking reaction to cure the resin. The crosslink density can be readily controlled by adjusting the concentration of acrylic double bond. Further, since the resin contains the metal sulfonate groups and, if any, carboxyl groups, affinity for magnetic particles is remarkably improved. Therefore, the radiation curable resin of the present invention is used, for example, as a binder of a magnetic composition for the production of a magnetic recording medium. In this case, the radiation curable resin is mixed with magnetic particles together with a suitable solvent. The magnetic composition is coated on a non-magnetic base to form a magnetic recording medium. By irradiation of electron rays or the like on the coated surface, crosslinking reaction proceeds to cure the resin.

Examples of magnetic particles include ferromagnetic iron oxide particles, ferromagnetic chromium dioxide particles, ferromagnetic alloy particles and the like. As ferromagnetic iron oxide particles, there can be used a substance of the formula: $FeO_x$ wherein x is in the range of $1.33 \leq x \leq 1.50$, for example, magnemite ($\gamma Fe_2O_3$, x=1.50), magnetite $\gamma\text{-}Fe_3O_4$, x=1.33) and their solid solution ($FeO_x$, $1.33<x<1.50$). In these ferromagnetic iron oxide particles, cobalt can be added to increase in coercive force. Ferromagnetic iron oxide particles are generally divided into two groups, i.e., dope type and adherend type and both can be used. As ferromagnetic chromium dioxide particles, there can be used $CrO_2$ or that incorporated with at least one of Ru, Sn, Te, Sb, Fe, Ti, V, Mn and the like to improve Hc. As ferromagnetic alloy particles, there can be used Fe, Co, Ni, Fe-Co, Fe-Ni, Fe-Co-Ni and the like. Other metallic ingredients such as Al, Si, Ti, Cr, Mn, Cu, Zn and the like can be added thereto to improve various properties.

As the solvent, there can be appropriately chosen and used ketone solvents such as acetone, methyl ethyl ketone, methyl isobutyl ketone, cyclohexanone, etc.; ester solvents such as methyl acetate, ethyl acetate, butyl acetate, ethyl lactate, glycol acetate monoethyl ether, etc.; ether and glycol ether solvents such as ether, glycol dimethyl ether, glycol monoethyl ether, dioxane, etc.; tar solvents (aromatic hydrocarbons) such as benzene, toluene, xylene, etc.; chlorinated hydrocarbon solvents such as methylene chloride, ethylene chloride, carbon tetrachloride, chloroform, ethylene chlorohydrin, dichlorobenzene, etc.; and the like.

In a magnetic composition, additives such as abrasives, for example, aluminum oxide, chromium oxide, silicon oxide, etc.; antistatic agents, for example, carbon black, etc.; and lubricants, for example, molybdenum disulfide, graphitel silicone oil, olive oil, etc. can be further added.

A resin which has been known for a binder of a magnetic composition in the magnetic recording medium can be admixed with magnetic particles together with the radiation curable resin of the present invention. In this case, the radiation curable resin of the present invention is used in an amount of not less than 20% by weight based on the total weight of the binder. When the amount is less than 20% by weight, mechanical strength and solvent resistance of the resulting magnetic layer becomes inferior because only a few crosslinked parts are formed even by irradiation of electron rays and the like. Further, improvement of dispersibility of magnetic particles due to the metal sulfonate groups is hardly expected. Examples of such a known resin include vinyl chloride-vinyl acetate copolymer, vinyl chloride-vinyl acetate-vinyl alcohol copolymer, vinyl chloride-vinyl acetate-maleic acid copolymer, vinyl chloride-vinylidene chloride copolymer, vinyl chloride-acrylonitrile copolymer, acryl ester-acrylonitrile copolymer, acryl ester-vinylidene chloride copolymer, methacrylate ester-vinylidene chloride copolymer, methacrylate ester-styrene copolymer, thermoplastic polyurethane resin, phenoxy resin, polyvinyl fluoride, polyvinylidene chloride, polyacrylonitrile, butadiene-acrylonitrile copolymer, acrylonitrile-butadieneacrylic acid copolymer, acrylonitrile-butadiene-methacrylic acid copolymer, polyvinyl butyral, cellulose derivatives, styrene-butadiene copolymer, polyester resins, phenol resins, epoxy resins, thermosetting polyurethane resins, urea resins, melamine resins, alkyd resins, urea-formaldehyde resins and a mixture thereof.

As the non-magnetic base, there can be used polyesters such as polyethylene terephthalate, polyethylene-2,6-naphthalate, etc.; polyolefins such as polyethylene, polypropylene, etc.; cellulose derivatives such as cellulose triacetate, cellulose diacetate, cellulose acetate butyrate, cellulose acetate propionate, etc.; and vinyl resins such as polyvinyl chloride, polyvinylidene chloride, etc.; and other plastics such as polycarbonate, polyimide, etc. In addition to these materials, non-magnetic metals such as aluminum, copper, tin, zinc, non-magnetic alloys containing these metals, etc.; ceramics such as glass, pottery, porcelain, etc.; papers such as paper, baryta, paper coated or laminated with α-olefin having 2 to 10 carbon atoms (e.g., polyethylene, polypropylene or ethylene-butene) etc. can be also used as the non-magnetic base. The magnetic base may be transparent or opaque according to a particular use thereof. The magnetic base may be in the form of film, tape, sheet disk, card, drum and the like and a suitable material can be chosen according to a particular form. In the case of the magnetic base in the form of film, tape or sheet, it is about 1 to 50 μm, preferably, 1 to 30 μm in thickness. In the case of the magnetic base in the form of disk or card, it is about 0.5 to 10 mm in thickness. In the case of the magnetic base in the form of drum, it has a cylindrical shape and modified according to a particular recorder to be applied.

After the magnetic composition is coated on the non-magnetic base and dried, usually, a calender treatment is effected. Then, irradiation is effected to cure coated surface to form a magnetic layer. Usually, the irradiation is effected with electron rays and irradiation dose is 1 to 10 Mrad, preferably, 2 to 7 Mrad. In the case of using an electron accelerator for irradiation, accelerating voltage is preferably not less than about 100 KV. Instead of electron rays, there can be also used ionizing radiations such as neutron rays, α-rays, ultraviolet and the like.

The following Examples and Comparative Examples further illustrate the present invention is detail but are not to be construed to limit the scope thereof. All "parts" are by weight unless otherwise stated.

EXAMPLE 1

(1) Synthesis of copolyester

Dimethyl terephthalate (265 parts), dimethyl isophthalate (256 parts), ethylene glycol (409 parts), neopentyl glycol (458 parts) and tetrabutoxy titanate (0.68 part) were charged in an autoclave equipped with a thermometer and a stirrer and heated at 150° to 230° C. for 120 minutes to effect ester interchange reaction. Then, adipic acid (292 parts) and 5-sodium sulfoisophthalic acid (65 parts) were added and the reaction was continued at 220° to 230° C. for additional 1 hour. After the temperature of the reaction system was raised up to 250° C. over 30 minutes, the pressure of the system was gradually reduced to 10 mmHg over 45 minutes. The reaction was continued for additional 60 minutes. The copolyester A thus obtained had the molecular weight of 2,000, the acid value of 17.8 equivalent/$10^6$ g and the metal sulfonate group content in the resin of 210 equivalent/$10^6$ g. The metal sulfonate group content was determined by measuring sulfur concentration in the polyester. The resin composition of the copolyester A is shown in Table 1 hereinafter. The resin composition was analyzed by NMR.

(2) Synthesis of polyurethane acrylate (electron radiation curable resin)

The copolyester A obtained in the above (1) (100 parts), toluene (105 parts) and methyl ethyl ketone (105 parts) were charged into a reaction vessel equipped with a thermometer, a stirrer and a reflux condenser to dissolve copolyester A. Further, diphenylmethane diisocyanate (26 parts) was added and the reaction was carried out at 70° to 80° C. for 3 hours to obtain a prepolymer having terminal isocyanates. The reaction vessel was cooled to 60° C and pentaerythritol triacrylate (6 parts). The reaction was carried out at 70° to 80° C. for 3 hours. Then, neopentyl glycol (2.5 parts) and glycerin monoacrylate (3 parts) were added and the reaction was carried out at 70° to 80° C. for 6 hours to obtain a solution of a polyurethane acrylate A-1. The charged OH/NCO (equivalent ratio) were 1.005. The solution of the polyurethane acrylate A-1 thus obtained contained no gel and, after allowing to stand for 40 days at 25° C., no disorder was observed. The polyurethane acrylate A-1 had the molecular weight of 12,000 and the metal sulfonate group content in the resin of 140 equivalent/$10^6$ g. The metal sulfonate group content was determined by measuring sulfur concentration in the polyurethane acrylate. The results are shown in Table 2 hereinafter.

(3) Determination of properties of polyurethane acrylate (electron radiation curable resin)

The polyurethane acrylate A-1 obtained in the above (2) was diluted with a mixed solvent of methyl ethyl ketone and toluene (weight ratio 1 : 1) to prepare a solution containing 10% by weight of the polyurethane acrylate A-1. The solution was coated on a polypropylene film having the thickness of 100 μm so that the thickness of the coated layer was 50 μm after drying. The coated surface was hot air-dried at 100° C. for 1 minute and then irradiated with electron beams of 5 Mrad. The polyurethane acrylate A-1 film thus irradiated with electron beams was released from the polypropylene film and its gel fraction and mechanical properties were determined. The film had the gel fraction of 90% by weight, Young's modulus of 12,000 Kg/cm$^2$, breaking strength of 420 Kg/cm$^2$ and breaking extension of 125%. The results are shown in Table 3 hereinafter. The gel fraction and mechanical strength were determined as follows.

(a) Gel fraction

The polyurethane acrylate A-1 film irradiated with electron beams was dipped in methyl ethyl ketone at room temperature for 24 hours. The weight of the insoluble part was determined. The weight ratio of the insoluble part to the resin was expressed as the gel fraction.

(b) Mechanical properties (Young's modulus, breaking strength and breaking extension)

Mechanical properties were determined by using Tensilon tensile tester under conditions of the sample width of 10 mm, the elongation rate of 200 mm/min. and the sample length of 40 mm.

(4) Preparation of magnetic composition using polyurethane acrylate (electron radiation curable resin) and determination of properties of resulting magnetic layer The polyurethane acrylate A-1 obtained in the above (2) was diluted with a mixed solvent of methyl ethyl ketone and toluene (weight ratio 1 : 1) to prepare a solution of the polyurethane acrylate A-1 having solids content of 40% by weight. To the solution (30 parts) were added corbalt adhered γ-$Fe_2O_3$ (magnetic particles) (60 parts), methyl ethyl ketone (25 parts), toluene 25 parts) and methyl isobutyl ketone (25 parts) and mixed in a ball mill for 24 hours. The resulting magnetic composition was coated on a polyethylene terephthalate film having the thickness of 25 μm so that the magnetic layer was 6 μm in thickness after drying. After subjecting to magnetic field orientation treatment toward the lengthwise direction by applying direct magnetic field of 2,500 gauss to the coated layer for 0.05 second, the coated surface was hot air-dried at 100° C. for 1 minute. Then, a calender treatment was effected and electron beams of 5 Mrad were irradiated on the coated surface. Properties of the coated surface irradiated with electron beams were determined. The layer had gloss (60°) of 92%, Br/Bm ratio of 0.87 and dust score of 0. These are determined as follows.

(a) Gloss (60°)

Gloss was determined by using a glossmeter (manufactured by Tokyo Denshoku K.K. in Japan).

(b) Br/Bm ratio

Br/Bm ratio was determined by using a device for testing magnetic properties (manufactured by Riken Denshi K.K. in Japan).

(c) Dust score

A magnetic tape was prepared from the magnetic film obtained. The tape was actually used and the amount of dust adhered to pinch rolls, capstan, guide head and the like were evaluated by scoring according to a bad mark system of 0 to −5.

Further, adhesion between the magnetic layer and the polyethylene terephthalate film was evacuated according to the method of ASTM D-3359. The adhesion was good. These results are shown in Table 3 hereinafter.

EXAMPLE 2

According to the same manner as described in Example 1, the copolyester A was prepared.

According to the same manner as described in Example 1, a polyurethane acrylate A-1' was prepared from the copolyester A except that glycerin diacrylate (3 parts) was used instead of pentaerythritol triacrylate and neopentyl glycol (0.8 part) and glycerin monoacrylate (6 parts) were used. The charged OH/NCO (equivalent ratio) was 0.981. A solution of the resulting polyurethane acrylate A-1' contained no gel and no disorder was observed even after allowing to stand at 25° C. for 40 days. The polyurethane acrylate A-1' had the molecular weight of 20,000 and the metal sulfonate group in the resin of 150 equivalent/$10^6$ g. The results are shown in Table 2.

The polyurethane acrylate A-1' was irradiated with electron rays according to the same manner as described in Example 1 and its mechanical properties were determined. The polyurethane acrylate A-1' had gel fraction of 98% by weight, Young's modulus of 11,800 Kg/$cm^2$, breaking strength of 430 Kg/$cm^2$ and breaking extension of 110%. The results are shown in Table 3.

A magnetic composition was prepared by using the polyurethane acrylate A-1' according to the same manner as described in Example 1. Properties of the magnetic composition were determined according to the same manner as described in Example 1. The composition had gloss (60°) of 93%, Br/Bm ratio of 0.87 and dust score of 0. Further, adhesion between the magnetic layer and the polyethylene terephthalate film was good. The results are shown in Table 3.

EXAMPLE 3

According to the same manner as described in Example 1, a copolyester B was prepared except that dimethyl terephthalate (439 parts), dimethyl isophthalate (439 parts), ethylene glycol (409 parts), neopentyl glycol (458 parts), tetrabutoxy titanate (1.20 parts) and 2-sodium sulfoisophthalic acid (104 parts) were used and adipic acid was not used. The copolyester B thus obtained had the molecular weight of 1,800, the acid value of 9.0 equivalent/$10^6$ g, and the metal sulfonate group content of 310 equivalent/$10^6$ g. The metal sulfonate group content was determined by measuring the concentration of sulfur in the copolyester B. The resin composition of the polyester B is shown in Table 1. The resin composition was analyzed by NMR.

According to the same manner as described in Example 1, a polyurethane acrylate B-1 was prepared from the copolyester B except that neopentyl glycol was not used, glycerin diacrylate (6 parts) was used instead of pentaerythritol triacrylate and diphenylmethanediisocyanate (36 parts) and glycerin monoacrylate (10 parts) were used. The charged OH/NCO (equivalent ratio) was 0.965. The resulting solution of the polyurethane acrylate B-1 contained no gel and no disorder was observed even after allowing to stand at 25° C. for 40 days. The polyurethane acrylate B-1 had the molecular weight of 14,000 and the metal sulfonate group content of 230 equivalent/$10^6$ g. The results are shown in Table 2.

The polyurethane acrylate B-1 was irradiated with electron rays according to the same manner as described in Example 1 and its properties were determined. The polyurethane acrylate B-1 had gel fraction of 97% by weight, Young's modulus of 19,000 Kg/$cm^2$, breaking strength of 580 Kg/$cm^2$ and breaking extension of 51%. The results are shown Table 3.

According to the same manner as described in Example 1, a magnetic composition was prepared by using the polyurethane acrylate B-1. Properties of the composition were determined according to the same manner as described in Example 1. The composition had gloss (60°) of 92%, Br/Bm ratio of 0.87 and dust score of 0. Adhesion between the magnetic layer and the polyethylene terephthalate film was good. The results are shown in Table 3.

EXAMPLE 4

According to the same manner as described in Example 3, the copolyester B was obtained.

According to the same manner as described in Example 1, a polyurethane acrylate B-1' was prepared from the copolyester B except that diphenylmethanediisocyanate (34 parts) and neopentyl glycol (3.7 parts) were used. The charged OH/NCO (equivalent ratio) was 0.893. The resulting solution of the polyurethane acrylate B-1' contained no gel and no disorder was observed even after allowing to stand at 25° C. for 40 days. The polyurethane acrylate B-1' had the molecular weight of 10,500 and the metal sulfonate content in the resin of 210 equivalent/$10^6$ g. The results are shown in Table 2.

The polyurethane acrylate B-1' was irradiated with electron rays and its properties were determined according to the same manner as described in Example 1. The polyurethane acrylate B-1' had gel fraction of 95% by weight, Young's modulus of 21,000 Kg/cm$^2$, breaking strength of 610 Kg/cm$^2$ and breaking extension of 40%. The results are shown in Table 3.

According to the same manner as described in Example 1, a magnetic composition was prepared from the polyurethane acrylate B-1'. Properties of the composition was evaluated according to the same manner as described in Example 1. The composition had gloss (60°) of 94%, Br/Bm ratio of 0.87 and dust score of 0. Further, adhesive between the magnetic layer and the polyethylene terephthalate film was good. The results are shown in Table 3.

EXAMPLE 5

According to the same manner as described in Example 1, a copolyester C was obtained except that dimethyl terephthalate (530 parts), dimethyl isophthalate (530 parts) and 2-sodium sulfoisophthalic acid (32 parts) were used. The copolyester C obtained had the molecular weight of 4,000, the acid value of 5.3 equivalent/$10^6$ g and the metal sulfonate group content in the resin of 98 equivalent/$10^6$ g. The metal sulfonate group content was determined by measuring sulfur concentration in the copolyester. The resin composition of the copolyester C are shown in Table 1. The resin composition was analyzed by NMR.

According to the same manner as described in Example 1, a polyurethane acrylate C-1 was prepared from the copolyester C except that diphenylmethane diisocyanate (13 parts), pentaerythritol triacrylate (3.0 parts), neopentyl glycol (1.3 parts) and glycerin monoacrylate (1.5 parts) were used. The charged OH/NCO (equivalent ratio) was 1.019. The resulting solution of the polyurethane acrylate C contained no gel and no disorder was observed even after allowing to stand at 25° C. for 40 days. The polyurethane acrylate C-1 had the molecular weight of 12,000 and the metal sulfonate group content in the resin of 82 equivalent/$10^6$ g. The results are shown in Table 2.

The polyurethane acrylate C-1 was irradiated with electron rays and its properties were determined according to the same manner as described in Example 1. The polyurethane acrylate C-1 had gel fraction of 100% by weight, Young's modulus of 7,800 Kg/cm$^2$, breaking strength of 290 Kg/cm$^2$ and breaking extension of 210%. The results are shown in Table 3.

According to the same manner as described in Example 1, a magnetic composition was prepared. Properties of the composition were evaluated according to the same manner as described in Example 1. The composition has gloss (60°) of 92%, Br/Bm ratio of 0.86 and dust score of 0. Further, adhesion between the magnetic layer and the polyethylene terephthalate film was good. The results are shown in Table 3.

COMPARATIVE EXAMPLE 1

According to the same manner as described in Example 1, a copolyester D was obtained except that dimethyl terephthalate (274 parts), dimethyl isophthalate (274 parts), ethylene glycol (409 parts), neopentyl glycol (458 parts), tetrabutoxy titanate (1.20 parts) and 2-sodium sulfoisophthalic acid (650 parts) were used and adipic acid was not used. The resulting copolyester D had the molecular weight of 3,000, the acid value of 21.4 equivalent/$10^6$ g and the metal sulfonate group content in the resin of 2,100 equivalent/$10^6$ g. The composition of the resin is shown in Table 1. The composition of the resin was analyzed by NMR.

According to the same manner, a polyurethane acrylate D was prepared from the copolyester D except that diphenylmethane diisocyanate (17 parts), pentaerythritol triacrylate (5 parts) and neopentyl glycol (0.8 part) were used. The charged OH/NCO (equivalent ratio) was 1.000 When the resulting solution of the polyurethane acrylate D was cooled to room temperature after completion of the reaction, the polyurethane acrylate D was separated from the solvent. It was considered that the high metal sulfonate group content in the polyurethane acrylate D lowered solubility of the resin in the solvent to cause this separation. The polyurethane acrylate D had the molecular weight of 8,000 and the metal sulfonate content in the resin of 1,620 equivalent/$10^6$ g. The results are shown in Table 2.

COMPARATIVE EXAMPLE 2

According to the same manner as described in Example 1, the copolyester A was obtained.

According ot the same manner as described in Example 1, a polyurethane acrylate E was prepared from the copolyester A except that glycerin monoacrylate was not used, 2-hydroxyethyl methacrylate (HEMA) (1.9 parts) was used instead of pentaerythritol triacrylate and neopentyl glycol (4.8 parts) was used. The charged OH/NCO (equivalent ratio) was 1.000. The resulting solution of the polyurethane acrylate E contained no gel and no disorder was observed even after allowing to stand at 25° C. for 40 days. The polyurethane acrylate E had the molecular weight of 13,000 and the metal sulfonate group content in the resin of 156 equivalent/$10^6$ g. The results are shown in Table 2.

The polyurethane acrylate E was irradiated with electron rays and its properties were determined according to the same manner as described in Example 1. The polyurethane acrylate E had gel fraction of 2% by weight, Young's modulus of 1,600 Kg/cm$^2$, breaking strength of 500 Kg/cm$^2$ and breaking extension of 13%. The results are shown in Table 3.

According to the same manner as described in Example 1, a magnetic composition was prepared from the polyurethane acrylate E. Properties of the resulting magnetic composition were evaluated according to the same manner as described in Example 1. The magnetic composition had gloss (60°) of 18%, Br/Bm ratio of 0.60 and dust score of −1.0. Adhesion between the magnetic layer and the polyethylene terephthalate film was bad. The results are shown in Table 3.

COMPARATIVE EXAMPLE 3

According to the same manner as described in Example 1, the copolyester A was obtained.

According to the same manner as described in Example 1, a polyurethane acrylate F-1 was prepared from the copolyester A except that T-100 (a triisocyanate compound having isocyanate groups of different reactivity manufactured by Toray Industries Inc. in Japan) (15.6 parts) instead of diphenylmethane diisocyanate and 2-hydroxyethyl methacryalte (HEMA) (9.7 parts) is used instead of pentaerythritol triacrylate. The charged OH/NCH (equivalent ratio) was 1.800. The resulting solution of the polyurethane acrylate F-1 contained gel in an amount of 32 g per 100 g of the solution. The polyurethane polyacrylate F-1 had the molecular weight of 15,000 and the metal sulfonate group content of 168 equivalent/$10^6$ g. The results are shown in Table 2.

The polyurethane acrylate F-1 was irradiated with electron rays and its properties were determined according to the same manner as described in Example 1. the polyurethane acrylate F-1 had gel fraction of 90% by weight, Young's modulus of 11,600 Kg/cm$^2$, breaking strength of 417 Kg/cm$^2$ and breaking extension of 110%. The results are shown in Table 3.

COMPARATIVE EXAMPLE 4

According to the same manner as described in Example 1, a copolyester E was prepared except that 5-sodium sulfoisophthalic acid was not used, and dimethyl isophthalate (274 parts) and tetrabutoxy titanate (0.72 part) were used. The resulting copolyester E had the molecular weight of 500, the acid value of 71.2 equivalent/$10^6$ g and no metal sulfonate group in the resin. The resin composition of the copolyester E is shown in Table 1. The resin composition was analyzed by NMR.

According to the same manner as described in Example 1, a polyurethane acrylate G was prepared from the copolyester E except that glycerin diacrylate (3 parts) was used instead of pentaerythritol triacryalte, and diphenylmethane diisocyanate (57 parts) and neopentyl glycol (10.4 parts) were used. The charged OH/NCO was 1.000. The resulting solution of the polyurethane acrylate G contained no gel and no disorder was observed even after allowing to stand at 25° C. for 40 days. The polyurethane acrylate G had the molecular weight of 21,000 and no metal sulfonate group was contained. The results are shown in Table 2.

The polyurethane acrylate G was irradiated with electron rays and its properties were determined according to the same manner as described in Example 1. The polyurethane acrylate G had gel fraction of 95% by weight, Young's modulus of 16,500 Kg/cm$^2$, breaking strength of 380 Kg/cm$^2$ and breaking extension of not more than 1%. The results are shown in Table 3.

A magnetic composition was prepared from the polyurethane acrylate G and its properties were evaluated according to the same manner as described in Example 1. The composition had gloss (60°) of 21%, Br/Bm ratio of 0.60 and dust score of −1.0. Adhesion between the magnetic layer and the polyethylene terephthalate film was bad. The results are shown in Table 3.

COMPARATIVE EXAMPLE 5

According to the same manner as described in Example 1, a copolyester F was prepared except that 5-sodium sulfoisophthalic acid and adipic acid were not used and dimethyl isophthalate (457 parts) and tetrabutoxy titanate (1.21 part) were used. The resulting copolyester F had the molecular weight of 12,000, the acid value of 3.6 equivalent/$10^6$ g and no metal sulfonate group in the resin. The resin composition of the copolyester F is shown in Table 1. The resin composition was analyzed by NMR.

According to the same manner as described in Example 1, a polyurethane acrylate H was prepared from the copolyester F except that neopentyl glycol was not used, and diphenylmethane diisocyanate (4.2 parts), pentaerythritol triacrylate (3 parts) and glycerin monoacrylate (0.1 part) were used. The charged OH/NCO was 1.000. The resulting solution of the polyurethane acrylate H contained no gel and no disorder was observed even after allowing to stand at 25° C. for 40 days. The polyurethane acrylate H had the molecular weight of 26,000 and no metal sulfonate group was contained. The results are shown in Table 2.

The polyurethane acrylate H was irradiated with electron rays and its properties were determined according to the same manner as described in Example 1. The polyurethane acrylate G had gel fraction of 15% by weight, Young's modulus of 19,000 Kg/cm$^2$, breaking strength of 500 Kg/cm$^2$ and breaking extension of not more than 12%. The results are shown in Table 3.

A magnetic composition was prepared from the polyurethane acrylate H and its properties were evaluated according to the same manner as described in Example 1. The composition had gloss (60°) of 20%, Br/Bm ratio of 0.61 and dust score of −1.0. Adhesion between the magnetic layer and the polyethylene terephthalate film was bad. The results are shown in Table 3.

TABLE 1

| | Copolyester | | | | | |
|---|---|---|---|---|---|---|
| | A | B | C | D | E | F |
| Carboxylic acid | | | | | | | content of the polyurethane acrylate A-2 are shown in Table 4.

According to the same manner as described in Example 1, gel fraction and mechanical properties of the cured polyurethane acrylate A-2 and properties of the magnetic layer prepared therefrom were determined. The results are shown in Table 5.

Dispersion stability test of a magnetic composition was carried out as follows.

A magnetic composition prepared according to the same manner as described in Example 1 was placed in a test tube so that height of the composition was 10 cm and the test tube was allowed to stand for 24 hours. Then, sedimentation magnetic particles was determined by measuring the distance from the top of liquid level to the top of the settled magnetic particles. When the distance is shorter, the magnetic composition is more stable.

TABLE 1-continued

| ingredient (mole %) | Copolyester | | | | | |
| --- | --- | --- | --- | --- | --- | --- |
|  | A | B | C | D | E | F |
| terephthalic acid | 28 | 48 | 29 | 30 | 30 | 50 |
| isophthalic acid | 28 | 48 | 29 | 30 | 30 | 50 |
| 5-sodium sulfoisophthalic acid | 4 | 6 | 2 | 40 | — | — |
| adipic acid | 40 | — | 40 | — | 40 | — |
| Glycol ingredient (mole %) | | | | | | |
| ethylene glycol | 55 | 55 | 55 | 55 | 55 | 55 |
| neopentyl glycol | 45 | 45 | 45 | 45 | 45 | 45 |
| Properties | | | | | | |
| molecular weight | 2000 | 1800 | 4000 | 3000 | 500 | 12000 |
| acid value (equivalent/$10^6$ g) | 17.8 | 9.0 | 5.3 | 21.4 | 71.2 | 3.6 |
| metal sulfonate group content (equivalent/$10^6$ g) | 210 | 310 | 98 | 2100 | 0 | 0 |

TABLE 2

| | Copolyester (parts) | Diisocyanate diphenylmethane diisocyanate (parts) | Triisocyanate T-100 (parts) | Compound B | | | Polyol neopentylglycol (parts) | Compound A glycerin monoacrylate (parts) | Polyurethane acrylate | Properties | |
| --- | --- | --- | --- | --- | --- | --- | --- | --- | --- | --- | --- |
| | | | | pentaerythritol triacrylate (parts) | glycerin diacrylate (parts) | 2-hydroxy ethyl methacrylate (parts) | | | | molecular weight | metal sulfonate group (eq/$10^6$ g) |
| Ex. 1 | A 100 | 26 | — | 6 | — | — | 2.5 | 3 | A-1 | 12000 | 140 |
| Ex. 2 | A 100 | 26 | — | — | 3 | — | 0.8 | 6 | A-1' | 20000 | 150 |
| Ex. 3 | B 100 | 36 | — | — | 6. | — | — | 10 | B-1 | 14000 | 230 |
| Ex. 4 | B 100 | 34 | — | 6 | — | — | 3.7 | 3 | B-1' | 10500 | 210 |
| Ex. 5 | C 100 | 13 | — | 3 | — | — | 1.3 | 1.5 | C-1 | 12000 | 82 |
| Comp. Ex. 1 | D 100 | 17 | — | 5 | — | — | 0.8 | 3 | D | 8000 | 1620 |
| Comp. Ex. 2 | A 100 | 26 | — | — | — | 1.9 | 4.8 | — | E | 13000 | 156 |
| Comp. Ex. 3 | A 100 | — | 15.6 | — | — | 9.7 | — | — | F-1 | 15000 | 168 |
| Comp. Ex. 4 | E 100 | 57 | — | — | 3 | — | 10.4 | 3 | G | 21000 | 0 |
| Comp. Ex. 5 | F 100 | 4.2 | — | 3 | — | — | — | 0.1 | H | 26000 | 0 |

TABLE 3

| | Polyurethane acrylate | Stability of solution at 25° C. for 40 days | Properties of cured transparent film of polyurethane acrylate* | | | | Properties of magnetic layer* | | |
| --- | --- | --- | --- | --- | --- | --- | --- | --- | --- | --- |
| | | Gel (g) | | gel fraction (wt %) | Young's modulus (Kg/cm$^2$) | breaking strength (Kg/cm$^2$) | breaking extension (%) | gloss (60°) (%) | Br/Bm ratio | dust score | adhesion |
| Ex. 1 | A-1 | 0 | normal | 90 | 12000 | 420 | 125 | 92 | 0.87 | 0 | 100/100 |
| Ex. 2 | A-1' | 0 | normal | 98 | 11800 | 430 | 110 | 93 | 0.87 | 0 | 100/100 |
| Ex. 3 | B-1 | 0 | normal | 97 | 19000 | 580 | 51 | 92 | 0.87 | 0 | 100/100 |
| Ex. 4 | B-1' | 0 | normal | 95 | 21000 | 610 | 40 | 94 | 0.87 | 0 | 100/100 |
| Ex. 5 | C-1 | 0 | normal | 100 | 7800 | 290 | 210 | 92 | 0.86 | 0 | 100/100 |
| Comp. Ex. 1 | D | polyurethane acrylate was separated | — | — | — | — | — | — | — | — |
| Comp. Ex. 2 | E | 0 | normal | 2 | 1600 | 500 | 13 | 18 | 0.60 | −1.0 | 0/100 |
| Comp. Ex. 3 | F-1 | 32 | normal | 90 | 11600 | 417 | 110 | 92 | 0.87 | 0 | 100/100 |
| Comp. Ex. 4 | G | 0 | normal | 95 | 16500 | 380 | 1< | 21 | 0.60 | −1.0 | 0/100 |
| Comp. Ex. 5 | H | 0 | normal | 15 | 19000 | 500 | 12 | 20 | 0.61 | −1.0 | 0/100 |

*irradiation of electron rays of 5 Mrad

EXAMPLE 6

According to the same manner as described in Example 1, a polyurethane acrylate A-2 was prepared from the copolyester A except that dimethylol propionic acid (3.2 parts) was used instead of neopentyl glycol (2.5 parts). The acid value and the metal sulfonate group

EXAMPLES 7 TO 10

According to the same manner as described in Example 6, the polyurethane acrylates A-2', B-2, B-2' and C-2 as shown in Table 4 were prepared and evaluated. The results are shown in Table 5.

COMPARATIVE EXAMPLE 6

According to the same manner as described in Example 6, the polyurethane acrylate F-2 as shown in Table 4 was prepared and evaluated. The results are shown in Table 5.

obtained by using the resin has inferior affinity of the resin for magnetic particles. Therefore, dispersion stability of magnetic particles and magnetic properties such as gloss and Br/Bm ratio are inferior. Further, dust is observed and adhesion between a magnetic layer and a non-magnetic base is bad.

TABLE 4

|  | Copolyester (parts) | Diisocyanate diphenylmethane diisocyanate (parts) | Triisocyanate T-100 (parts) | Compound B | | | Polyol neopentylglycol (parts) |
|---|---|---|---|---|---|---|---|
|  |  |  |  | pentaerythritol triacrylate (parts) | glycerin di-acrylate (parts) | 2-hydroxyethyl methacrylate (parts) |  |
| Ex. 6 | A 100 | 26 | — | 6 | — | — | — |
| Ex. 7 | A 100 | 26 | — | — | 3 | — | — |
| Ex. 8 | B 100 | 44.6 | — | — | 6 | — | 1.5 |
| Ex. 9 | B 100 | 34 | — | 6 | — | — | — |
| Ex. 10 | C 100 | 13 | — | 3 | — | — | — |
| Comp. Ex. 6 | A 100 | — | 19.6 | — | — | 9.7 | — |

|  | Compound A glycerin mono-acrylate (parts) | Compound C dimethylol pro-pionic acid (parts) | Polyurethane acrylate | Properties | | |
|---|---|---|---|---|---|---|
|  |  |  |  | molecular weight | metal sulfonate group content (eq/$10^6$ g) | acid value (eq/$10^6$ g) |
| Ex. 6 | 3 | 3.2 | A-2 | 12000 | 140 | 200 |
| Ex. 7 | 5 | 1.4 | A-2' | 20000 | 150 | 100 |
| Ex. 8 | 8 | 6.0 | B-2 | 14000 | 230 | 280 |
| Ex. 9 | 3 | 4.8 | B-2' | 10500 | 210 | 250 |
| Ex. 10 | 1.5 | 1.7 | C-2 | 12000 | 82 | 110 |
| Comp. Ex. 6 | — | 3.0 | F-2 | 14000 | 168 | 190 |

TABLE 5

|  | Poly-urethane acrylate | Gel (g) | Stability of solution at 25° C. for 40 days | Properties of cured transparent film of polyurethane acrylate* | | | | | Properties of magnetic layer* | | | Dispersion stability (cm) |
|---|---|---|---|---|---|---|---|---|---|---|---|---|
|  |  |  |  | gel fraction (wt %) | Young's modulus (Kg/cm$^2$) | breaking strength (Kg/cm$^2$) | breaking extension (%) | gloss (60°) (%) | Br/Bm ratio | dust score | adhesion |  |
| Ex. 6 | A-2 | 0 | normal | 92 | 12500 | 450 | 150 | 99 | 0.87 | 0 | 100/100 | 0.5 |
| Ex. 7 | A-2' | 0 | normal | 97 | 11700 | 445 | 114 | 99 | 0.88 | 0 | 100/100 | 0.2 |
| Ex. 8 | B-2 | 0 | normal | 98 | 19500 | 600 | 46 | 98 | 0.88 | 0 | 100/100 | 0.7 |
| Ex. 9 | B-2' | 0 | normal | 96 | 20000 | 630 | 42 | 100 | 0.89 | 0 | 100/100 | 0.3 |
| Ex. 10 | C-2 | 0 | normal | 100 | 7400 | 300 | 250 | 96 | 0.87 | 0 | 100/100 | 0.5 |
| Comp. Ex. 6 | F-2 | 35 | normal | 91 | 11300 | 423 | 123 | 89 | 0.85 | 0 | 100/100 | 2.1 |
| Comp. Ex. 2 | E | 0 | normal | 2 | 1600 | 500 | 13 | 18 | 0.60 | −1.0 | 100/100 | 2.0 |
| Comp. Ex. 4 | G | 0 | normal | 95 | 16500 | 380 | 1< | 21 | 0.60 | −1.0 | 0/100 | 1.8 |
| Comp. Ex. 5 | H | 0 | normal | 15 | 19000 | 500 | 12 | 20 | 0.61 | −1.0 | 0/100 | 3.2 |

*irradiation of electron rays of 5 Mrad

As seen from the results of Examples and Comparative Examples, the radiation curable polyurethane acrylate resin of the present invention does not form gel during its synthesis. The resin irradiated with electron rays has large crosslink density and therefore mechanical properties thereof is remarkably improved. A magnetic composition obtained by using the resin has very good affinity of the resin for magnetic particles. Further, in the case that the resin contains carboxyl group, dispersion stability of magnetic particles in the composition is remarkably improved. Therefore, magnetic properties of the resulting magnetic recording medium is remarkably improved and no dust is observed. Furthermore, adhesion between the magnetic layer and the base is bery good.

On the other hand, a conventional radiation curable resin which does not have any acrylic double bond in the side chain and therefore the irradiated resin has low crosslink density which results in small gel fraction and inferior mechanical properties. A magnetic composition When acrylic double bond is introduced into a side chain by using the triisocyanate compound, T-100, a lage amount of gel is formed during synthesis of resin. When a radiation curable resin does not contain any metal sulfonate group and/or carboxyl group in a side chain, dispersion stability of magnetic particles and magnetic properties of a resulting magnetic layer are inferior. Further, dust is formed and adhesion between a magnetic layer and a base is bad.

What is claimed is:

1. A radiation curable resin which is a polyurethane acrylate having (meth)acryloyloxy groups at the terminal end of the molecule and in the molecular chain thereof, and containing metal sulfonate groups in the molecule in a ratio of 3.0 to 1,500 equivalent/$10^6$ g of the resin, said polyurethane acrylate being obtained by reaction of (1) a copolyester having hydroxyl groups at both terminal ends of the molecule and containing metal sulfonate groups therein,
(2) a diisocyanate,
(3) a compound (A) having at least one (meth)acryloyloxy group and two hydroxyl groups,
(4) a compound (B) having at least one (meth)acryloyloxy group and one hydroxyl group, and optionally
(5) a polyol other than the above (1) or (3).

2. A radiation curable resin according to claim 1, wherein an equivalent ratio of hydroxyl group of the copolyester to isocyanate group of the diisocyanate (OH/NCO) is 50 to 125/200.

3. A radiation curable resin according to claim 1, wherein the compound (A) is a member selected from the group consisting of mono(meth)-acrylates of triols such as trimethylolpropane, trimethylolethane and glycerin etc.; di(meth)acrylates of tetraols such as pentaerythritol, etc.; and 2 mole (meth)-acrylic acid adducts of diepoxy compounds.

4. A radiation curable resin according to claim 1, wherein the compound (A) is reacted with the copolyester in a ratio of 0.1 to 50 parts by weight 100 parts by weight of the copolyester.

5. A radiation curable resin according to claim 1, wherein the compound (B) is a member selected from the group consisting of mono(meth)acrylates of diols such as ethylene glycol, propylene glycol, etc.; di(meth)acrylates of triols such as trimethylolpropane, glycerin, etc.; tri(meth)acrylates of tetraols such as pentaerythritol, etc.; and penta(meth)acrylate of dipentaerythritol, etc.

6. A radiation curable resin according to claim 1, wherein the compound (B) is reacted with the copolyester in a ratio of 0.1 to 50 parts by weight per 100 parts by weight of the copolyester.

7. A radiation curable resin according to claim 1, wherein the polyol is a member selected from the group consisting of ethylene glycol, propylene glycol, 1,3-propanediol, 1,4-butanediol, 1,5-pentanediol, 1,6-hexanediol, neopentyl glycol, diethylene glycol, dipropylene glycol, 2,2,4-trimethyl-1,3-pentanediol, 1,4-cyclohexane methanol, spyroglycol, ethylene oxide adduct and propylene oxide adduct of bisphenol A, polyethylene glycol, polypropylene glycol, polytetramethylene glycol, trimethylolethane and glycerin, pentaerythritol.

8. A radiation curable resin according to claim 1, wherein the polyol is subjected to the reaction in an amount of not more than 50 parts by weight per 100 parts by weight of the copolyester.

9. A radiation curable resin which is a polyurethane acrylate having (meth)acryloyloxy groups at the terminal end of the molecule and in the molecular chain thereof, containing metal sulfonate groups in the molecule in a ratio of 3.0 to 1,500 equivalent/$10^6$ g of the resin, and further containing carboxyl groups in the molecule in a ratio of 5.0 to 2,000 equivalent/$10^6$ g of the resin, said polyurethane acrylate being obtained by reaction of
(1) a copolyester having hydroxyl groups at both terminal ends of the molecule and containing metal sulfonate groups therein,
(2) a diisocyanate,
(3) a compound (A) having at least one (meth)acryloyloxy group and two hydroxyl groups,
(4) a compound (B) having at least one (meth)acryloyloxy group and one hydroxyl groups,
(5) a compound (C) having at least one carboxyl group and two hydroxyl groups, and optionally
(6) a polyol other than the above (1), (3) or (5).

10. A radiation curable resin according to claim 9, wherein an equivalent ratio of hydroxyl group of the copolyester to isocyanate group of the diisocyanate (OH/NCO) is 50 to 125/200.

11. A radiation curable resin according to claim 9, wherein the compound (A) is a member selected from the group consisting of mono(meth)-acrylates of triols such as trimethylolpropane, trimethylolethane and glycerin etc.; di(meth)acrylates of tetraols such as pentaerythritol, etc.; and 2 mole (meth)-acrylic acid adducts of diepoxy compounds.

12. A radiation curable resin according to claim 9, wherein the compound (A) is reacted with the copolyester in a ratio of 0.1 to 50 parts by weight 100 parts by weight of the copolyester.

13. A radiation curable resin according to claim 9, wherein the compound (B) is a member selected from the group consisting of mono(meth)acrylates of diols such as ethylene glycol, propylene glycol, etc.; di(meth)acrylates of triols such as trimethylolpropane, glycerin, etc.; tri(meth)acrylates of tetraols such as pentaerythritol, etc.; and penta(meth)acrylate of dipentaerythritol, etc.

14. A radiation curable resin according to claim 9, wherein the compound (B) is reacted with the copolyester in a ratio of 0.1 to 50 parts by weight per 100 parts by weight of the copolyester.

15. A radiation curable resin according to claim 9, wherein the compound (C) is a member selected from the group consisting of dihydroxymono-carboxylic acids such as 2,3-dihydroxy-propionic acid, 2,3-dihydroxy-2-methylpropionic acid, 2,2-dihydroxymethylpropionic acid (dimethylolpropionic acid), 2,3-dihyroxy-2-(1-methyletnyl)butanoic acid, 3,11-dihyroxy-teteradecanoic acid, 9,10-dihyroxyoctadecanoic acid, etc.; dihydroxydicarboxylic acids such as 2,3-dihydroxybutanoic diacid, 2,3-dihydroxy-2-methylbutanoic diacid, 2,4-dihyroxypentanoic diacid, 2,4-dihydroxy-3-methylpentanoic diacid, 2,5-dihydroxyhexanoic diacid, 9,10-dihyroxyoctadecanoic diacid, 2,3-dihyroxy-2-butenoic diacid, etc.; and dihydroxytricarboxylic acids such as 1,2-dihyroxy-1,2,2-tricarboxylic acid, 1,3-dihyroxypropane-1,1,3-tricarboxylic acid, etc.

16. A radiation curable resin according to claim 9, wherein the polyol is a member selected from the group consisting of ethylene glycol, propylene glycol, 1,3-propanediol, 1,4-butanediol, 1,5-pentanediol, 1,6-hexanediol, neopentyl glycol, diethylene glycol, dipropylene glycol, 2,2,4-trimethyl-1,3-pentanediol, 1,4-cyclohexane methanol, spyroglycol, ethylene oxide adduct and propylene oxide adduct of bisphenol A, polyethylene glycol, polypropylene glycol, polytetramethylene glycol, trimethylolethane and glycerin, pentaerythritol.

17. A radiation curable resin according to claim 9, wherein the polyol is subjected to the reaction in an amount of not more than 50 parts by weight per 100 parts by weight of the copolyester.

* * * * *